(12) United States Patent

Brown

(10) Patent No.: US 7,992,377 B2
(45) Date of Patent: Aug. 9, 2011

(54) DIESEL EXHAUST CONTROL DURING LIMP-HOME MODE

(75) Inventor: David B. Brown, Brighton, MI (US)

(73) Assignee: GM Global Technology Operations LLC

(*) Notice: Subject to any disclaimer, the term of this patent is extended or adjusted under 35 U.S.C. 154(b) by 1190 days.

(21) Appl. No.: 11/639,370

(22) Filed: Dec. 14, 2006

(65) Prior Publication Data

US 2008/0141658 A1 Jun. 19, 2008

(51) Int. Cl.
*F01N 3/00* (2006.01)
*F02B 35/00* (2006.01)

(52) U.S. Cl. ............. 60/286; 60/295; 60/299; 60/300; 60/316

(58) Field of Classification Search ............ 60/286, 60/295, 299, 300, 316
See application file for complete search history.

(56) References Cited

U.S. PATENT DOCUMENTS

| | | | |
|---|---|---|---|
| 5,651,247 A | 7/1997 | Fränkle | |
| 6,041,591 A | 3/2000 | Kaneko et al. | |
| 7,065,958 B2 * | 6/2006 | Funk et al. | 60/286 |
| 2003/0171858 A1 * | 9/2003 | Kondo | 701/29 |
| 2006/0137327 A1 * | 6/2006 | Shirakawa et al. | 60/285 |
| 2007/0163245 A1 * | 7/2007 | Sheridan et al. | 60/286 |

FOREIGN PATENT DOCUMENTS

| | | |
|---|---|---|
| CN | 1169505 A | 1/1998 |
| DE | 4425018 C1 | 6/1995 |
| EP | 0826869 A2 | 1/1998 |

OTHER PUBLICATIONS

Brent D. Hendrickson; Entitled: "Method of Monitoring A Dosing Agent Supply for Treating Exhaust"; Filed Dec. 14, 2006; 23 Pages.
Michael A. Potter et al.; Entitled: Emissions Conformance For An Exhaust After-Treatment System Having A Dosing Agent Supply; Filed Dec. 14, 2006; 26 Pages.

* cited by examiner

*Primary Examiner* — Thomas E Denion
*Assistant Examiner* — Michael Carton

(57) ABSTRACT

A method of extending emissions performance of an exhaust after-treatment system of a vehicle that includes a dosing agent includes determining a level of a dosing agent source, selectively entering a limp-home mode based on the level and monitoring a catalyst temperature during said limp-home mode. Operation of an engine is regulated to increase the catalyst temperature when the catalyst temperature is less than a threshold catalyst temperature during the limp-home mode.

16 Claims, 5 Drawing Sheets

DIESEL EXHAUST CONTROL DURING LIMP-HOME MODE

CROSS-REFERENCE TO RELATED APPLICATIONS

This application is related to U.S. Ser. No. 11/639,369, filed on Dec. 14, 2006, entitled, "Method of Monitoring A Dosing Agent Supply For Treating Exhaust" and U.S. Ser. No. 11/639,397, filed on Dec. 14, 2006, entitled, "Emissions Conformance For An Exhaust After-Treatment System Having A Dosing Agent Supply". The disclosures of the above applications are incorporated herein by reference.

FIELD

The present invention relates to vehicle exhaust systems, and more particularly to a diesel exhaust control during a limp-home mode.

BACKGROUND

Internal combustion engines combust an air and fuel mixture to generate drive torque. The combustion process generates exhaust that is exhausted from the engine to atmosphere. The exhaust contains nitrogen oxides (NOx), carbon dioxide ($CO_2$) and carbon monoxide (CO) particulates. An exhaust after-treatment system treats the exhaust to reduce emissions prior to being released to atmosphere.

In an exemplary exhaust after-treatment system, a dosing system injects a dosing agent (e.g., urea) into the exhaust upstream of a catalyst. The exhaust and dosing agent mixture reacts over the catalyst to reduce the level of emissions. The dosing system includes a dosing agent supply and an injector. The amount of dosing agent injected is based on the level of emissions in the exhaust. If the dosing agent supply is empty or at a low level, insufficient dosing agent is injected into the exhaust stream and emissions are not reduced as desired.

It is a concern that vehicle operators may not replenish the required dosing agent. As disclosed in commonly assigned U.S. patent application Ser. No. 11/639,397, filed on Dec. 14, 2006, and entitled "Emissions Conformance For An Exhaust After-Treatment System Having A Dosing Agent Supply", the disclosure of which is incorporated herein by reference, vehicle operation can enter a limp-home mode that limits the vehicle drivability to encourage the vehicle operator to replenish the dosing agent.

SUMMARY

Accordingly, the present disclosure provides a method of extending emissions performance of an exhaust after-treatment system of a vehicle that includes a dosing agent. The method includes determining a level of a dosing agent source, selectively entering a limp-home mode based on the level and monitoring a catalyst temperature during said limp-home mode. Operation of an engine is regulated to increase the catalyst temperature when the catalyst temperature is less than a threshold catalyst temperature during the limp-home mode.

In one feature, the regulating includes throttling the engine.

In another feature, the regulating includes adjusting an air flow of the engine.

In another feature, the regulating includes adjusting a fueling rate of the engine.

In other features, the method further includes post-injecting fuel into exhaust upstream of the catalyst. The post-injecting occurs when the catalyst temperature is greater than the threshold catalyst temperature.

In still another feature, the catalyst temperature is monitored based on a catalyst temperature sensor signal.

In yet another feature, the catalyst temperature is monitored based on a catalyst temperature model.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
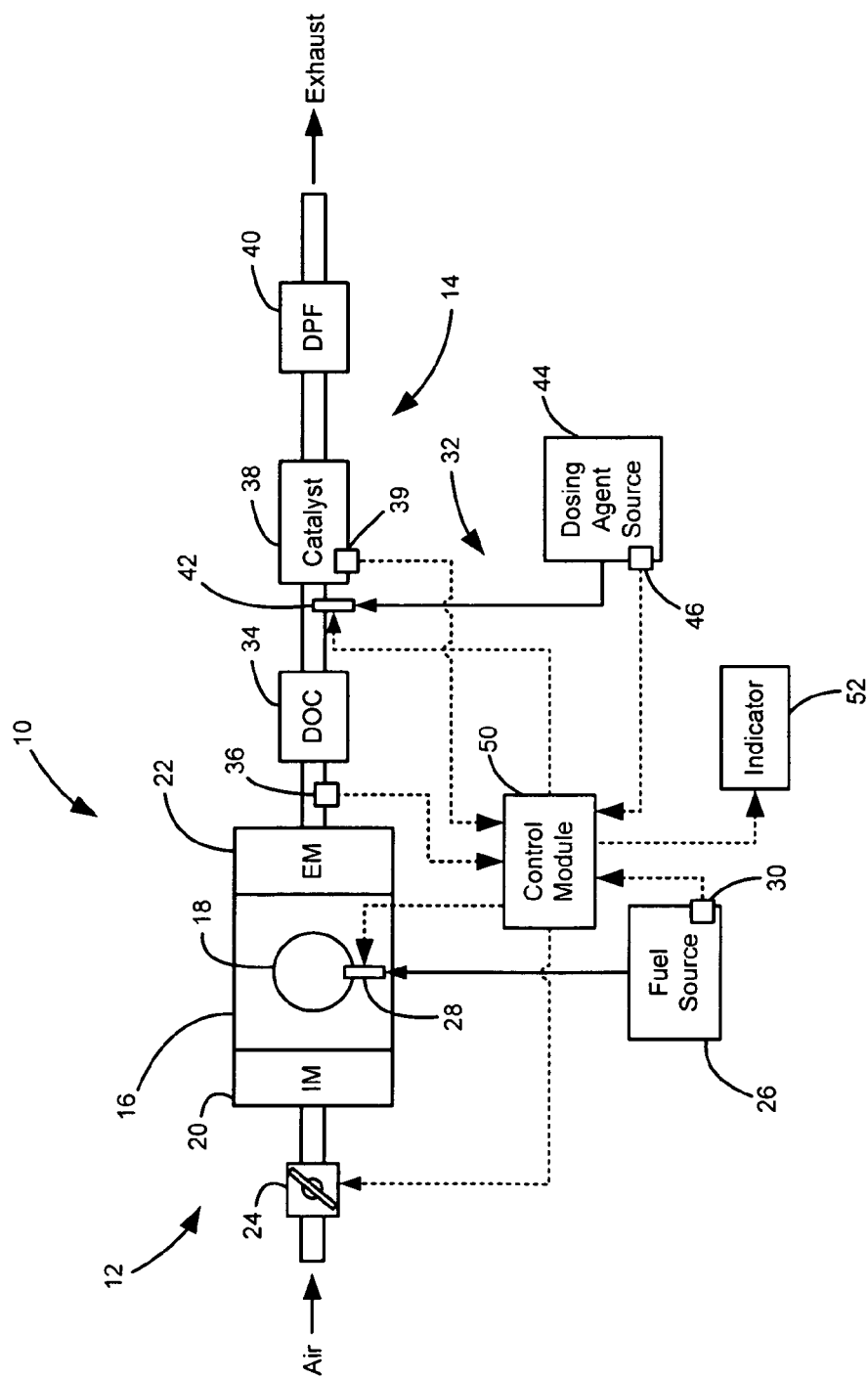
FIG. 1 is a functional block diagram of an exemplary vehicle system including an exhaust after-treatment system according to the present disclosure.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle system 10 is schematically illustrated. The vehicle system 10 includes an engine system 12, an exhaust after-treatment system 14. The engine system 12 includes an engine 16 having a cylinder 18, an intake manifold 20 and an exhaust manifold 22. Air flows into the intake manifold 20 through a throttle 24. The air is mixed with fuel and the air and fuel mixture is combusted within the cylinder 18 to drive a piston (not shown). Although a single cylinder 18 is illustrated, it is appreciated that the engine 12 may include additional cylinders 18. For example, engines having 2, 3, 4, 5, 6, 8, 10, 12 and 16 cylinders are anticipated. The fuel is provided from a fuel source 26 and is injected into the air stream using an injector 28. A fuel level sensor 30 is responsive to the amount of fuel within the fuel source 26.

Exhaust is produced through the combustion process and is exhausted from the cylinder 18 into the exhaust manifold 22. The exhaust after-treatment system 14 treats the exhaust flowing therethrough to reduce emissions before being released to the atmosphere. The exhaust after-treatment system 14 includes a dosing system 32, a diesel oxidation catalyst (DOC) 34, an emissions sensor 36 and a catalyst 38 that is preferably provided as a selective catalytic (SCR) catalyst.

The DOC 34 reacts with the exhaust to reduce emission levels of the exhaust. The emissions sensor 36 is responsive to an emissions (e.g., NOx) level of the exhaust. It is also anticipated that a diesel particulate filter (DPF) 40 may be located downstream from the catalyst 30 that filters diesel particulates to further reduce emissions.

The exhaust after-treatment system 14 can optionally include a catalyst temperature sensor 39 that is responsive to a temperature of the catalyst 38 ($T_{CAT}$) and that generates a temperature signal based thereon. The diesel exhaust control of the present disclosure can be implemented using the temperature sensor signal, as described in further detail below.

The dosing system 32 includes a dosing agent injector 42, a dosing agent storage tank 44 and a dosing agent supply sensor 46. The dosing system 32 selectively injects a dosing agent (e.g., urea) into the exhaust stream to further reduce emissions. More specifically, the amount of the dosing agent is determined based on the signal generated by the exhaust sensor. The exhaust and dosing agent mixture reacts within the catalyst 38 to further reduce exhaust emissions.

A control module 50 regulates operation of the vehicle system 10 based on the extended emissions conformance control of the present invention. More specifically, the control module 50 determines a dosing agent level ($DA_{LEVEL}$) based on the signal generated by the dosing agent supply sensor 46. The control module can calculate a vehicle range ($RANGE_{DA}$) based on the amount of dosing agent remaining. More specifically, $RANGE_{DA}$ indicates the remaining drivable distance before the entire dosing agent is consumed. $RANGE_{DA}$ can be displayed on a display (not shown) to alert the vehicle operator.

If $DA_{LEVEL}$ is below a first predetermined or low dosing agent threshold value ($DA_{LOW}$), the control module 50 sets a low dosing agent flag ($FLAG_{DALOW}$) (e.g., equal to 1 or TRUE) indicating that the dosing agent level is low and should be refilled. Additionally, the control module 50 activates an indicator 52 that alerts the vehicle operator that the dosing agent supply is low and should be refilled. The indicator 52 can be a visual and/or audible indication that alerts the vehicle operator to the low condition. If $DA_{LEVEL}$ is below a second predetermined or empty dosing agent threshold value ($DA_{EMPTY}$), the control module 50 sets an empty dosing agent flag ($FLAG_{DAEMPTY}$) (e.g., equal to 1 or TRUE). Further, the control module 50 activates the indicator 52 to indicate that the dosing agent source 44 is empty. When the dosing agent source 44 is refilled and $DA_{LEVEL}$ exceeds $DA_{EMPTY}$ and/or $DA_{LOW}$, $FLAG_{DAEMPTY}$ and/or $FLAG_{DALOW}$ is/are cleared and the indicator 52 is also cleared.

The extended emissions conformance control selectively impedes vehicle operation based on the dosing agent level. More specifically, if the dosing agent monitoring control determines that the vehicle is at a convenient location, a convenient location flag ($FLAG_{CL}$) is set (e.g., equal to 1 or TRUE). A convenient location can include, but is not limited to, a fuel station, a maintenance workshop and/or an oil change workshop. If $FLAG_{DALOW}$ is set and the vehicle is stopped at a convenient location (i.e., a location where additional dosing agent is available) the extended emissions conformance control disables operation of the vehicle by setting a disable flag ($FLAG_{DIS}$) until the dosing agent is replenished. It is also anticipated, however, that the vehicle operation need not be disabled even though the vehicle is at a convenient location, but can be impeded. More specifically, the vehicle operation can enter a limp-home mode, as described in further detail below.

The diesel exhaust control selectively impedes operation of the vehicle during the limp-home mode while meeting emissions requirements even in the absence of dosing agent. More specifically, $T_{CAT}$ is monitored during operation in the limp-home mode. If $T_{CAT}$ is less than a threshold temperature ($T_{THR}$), engine operation is regulated to increase the exhaust gas temperatures, thereby increasing $T_{CAT}$. $T_{THR}$ corresponds to a temperature at which the catalyst 38 is considered active. The exhaust gas temperatures can be increased by engine throttling and air flow control. More specifically, the intake throttle can be placed in closed position in order to reduce engine air flow and air-to-fuel ratio. The turbocharger settings can also be modified to reduce air flow through the engine and to increase exhaust temperatures. Additionally and/or alternatively, the fuel injection timing can be retarded to further increase the exhaust gas temperatures.

In one feature, $T_{CAT}$ can be directly measured using the temperature sensor 39. In an alternative feature, $T_{CAT}$ can be determined based on a catalyst temperature model that is processed by the control module 50. More specifically, engine speed, air flow and fuel quantity can be used as inputs for a catalyst temperature model.

Once $T_{CAT}$ exceeds $T_{THR}$, small amounts of fuel can be post-injected (i.e., injected into a cylinder just after a combustion event), such that the fuel is expelled from the cylinder with the exhaust and flows to the exhaust after-treatment system 14. The heat energy of the catalyst 38 induces combustion of the fuel, thereby maintaining $T_{CAT}$ above $T_{THR}$ or increasing $T_{CAT}$. The diesel exhaust control continues to operate the engine in this manner to maintain acceptable catalyst temperatures (i.e., whereby the catalyst is active) and emissions control. Once the dosing agent is replenished and the limp-home mode is exited, the engine system 12 can be operated using normal control strategies.

In accordance with other features of the present disclosure, when $FLAG_{DAEMPTY}$ is set and $FLAG_{CL}$ is not set (i.e., when the vehicle is not deemed to be at a convenient location), the limp-home mode is entered, whereby vehicle operation is impeded. Vehicle operation can be impeded by relaxing the drivability and fuel economy constraints, and employing more aggressive modes of combustion that reduce emissions. In one feature, pre-mixed charge compression ignition (PCCI) combustion is extensively used. PCCI combustion is known to significantly reduce $NO_x$ and particulate emissions, however, it may decrease fuel economy and increase engine noise. In an alternative feature, fueling levels are reduced. By lowering the fueling levels, engine power levels, $NO_x$ and particulate emissions are correspondingly reduced. At the same time, $T_{CAT}$ is monitored and controlled in accordance with the diesel exhaust control described above.

In an alternative feature, vehicle operation is impeded when $FLAG_{DALOW}$ is set. In this manner, the remaining dosing agent can be utilized in hand with the above-described engine operating modes, to maximize emissions performance while extending the dosing agent range. At the same time, $T_{CAT}$ is monitored and controlled in accordance with the diesel exhaust control described above. For example, the fueling levels can be reduced based on $DA_{LEVEL}$ to reduce emissions, and at the same time, the remaining dosing agent can be used to further reduce emissions below the desired level. By combining fueling level reduction and dosing agent emissions reduction, the drivability and fuel economy are not as adversely affected as would be by reducing fueling levels alone to achieve the desired emissions performance. However, if $T_{CAT}$ does not exceed $T_{THR}$, the engine system 12 is operated as described above to increase $T_{CAT}$.

Figure 2:
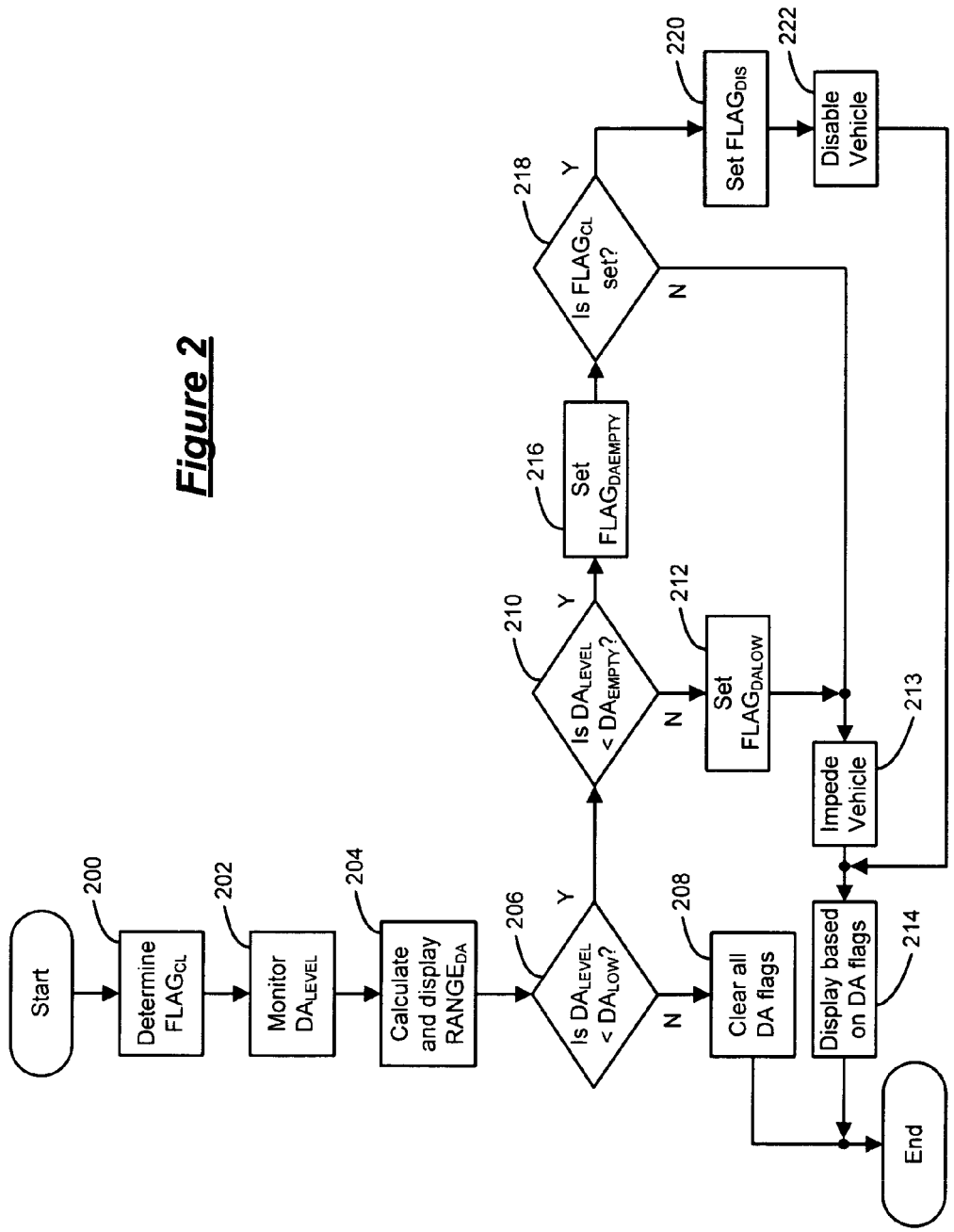
FIG. 2 is a flowchart illustrating exemplary steps executed by the diesel exhaust control of the present disclosure.

Referring now to FIG. 2, exemplary steps will be described in detail. In step 202, control monitors $DA_{LEVEL}$. Control calculates and displays $RANGE_{DA}$ in step 204 based on $DA_{LEVEL}$. In step 206, control determines whether $DA_{LEVEL}$ is less than $DA_{LOW}$. If $DA_{LEVEL}$ is not less than $DA_{LOW}$, control clears all dosing agent related flags in step 208 and control ends. If $DA_{LEVEL}$ is less than $DA_{LOW}$, control determines whether $DA_{LEVEL}$ is less than $DA_{EMPTY}$ in step 210. If $DA_{LEVEL}$ is not less than $DA_{EMPTY}$, control sets $FLAG_{DALOW}$ in step 212 and control continues in step 213. If $DA_{LEVEL}$ is less than $DA_{EMPTY}$, control sets $FLAG_{DAEMPTY}$ in step 216 and control continues in step 218.

In step 218, control determines whether $FLAG_{CL}$ is set. If $FLAG_{CL}$ is not set, control continues in step 213. If $FLAG_{CL}$ is set, control sets $FLAG_{DIS}$ in step 220. Control disables vehicle operation in step 222 and continues in step 214. In step 213, control impedes vehicle operation by implementing one of or a combination of the strategies discussed in detail above. In step 214, control displays the dosing agent status based on the dosing agent related flags and control ends. For example, "Dosing Agent Low", "Dosing Agent Empty" or "Vehicle Disable Due To Empty Dosing Agent" messages can be displayed.

Figure 3:
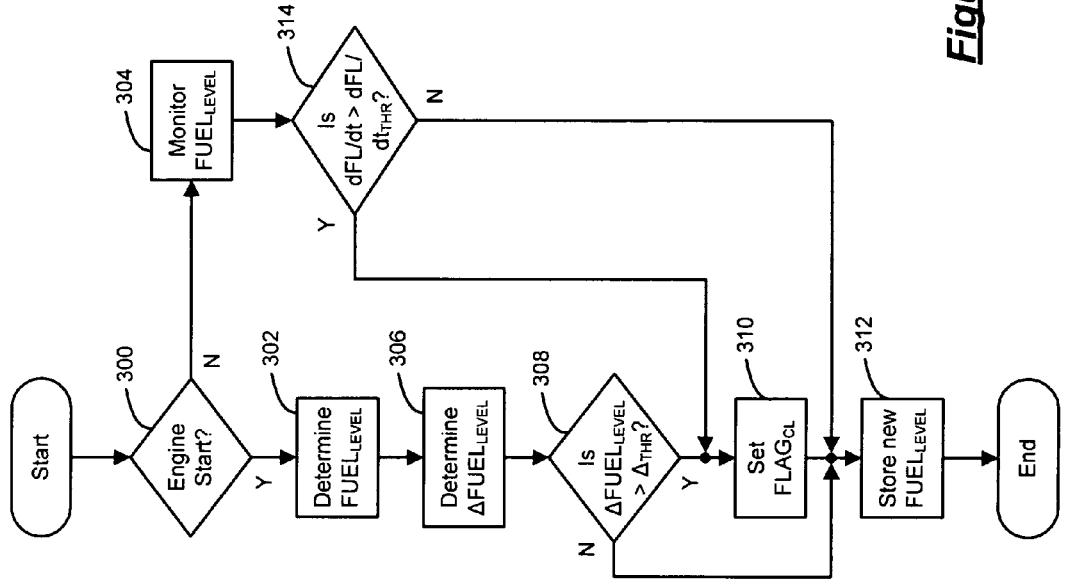
FIG. 3 is a flowchart illustrating exemplary steps executed by the diesel exhaust control to determine whether the vehicle is stopped at a convenient location.

Referring now to FIG. 3, exemplary steps to determine whether the vehicle is stopped at a convenient location will be described in detail. In step 300, control determines whether an engine start just occurred. If an engine start occurred, control continues in step 302. If an engine start did not occur, control continues in step 304.

In step 302, control determines $FUEL_{LEVEL}$. In step 306, control determines $\Delta FUEL_{LEVEL}$ as the difference between $FUEL_{LEVEL}$ and the fuel level that was stored in memory immediately prior to the last engine shut-off event. In step 308, control determines whether $\Delta FUEL_{LEVEL}$ is greater than a threshold difference ($\Delta_{THR}$). If $\Delta FUEL_{LEVEL}$ is greater than $\Delta_{THR}$, control determines that the vehicle was refueled during the most recent shut-down and continues in step 310. If $\Delta FUEL_{LEVEL}$ is not greater than $\Delta_{THR}$, control determines that the vehicle was not refueled during the most recent shut-down and continues in step 312.

In step 304, control continuously monitors $FUEL_{LEVEL}$. In step 314, control determines whether $FUEL_{LEVEL}$ is increasing at a rate (e.g., dFL/dt) greater than a threshold rate (e.g., $dFL/dt_{THR}$). If dFL/dt is greater than $dFL/dt_{THR}$, control determines that the vehicle is being refueled and continues in step 310. If dFL/dt is not greater than $dFL/dt_{THR}$, control determines that the vehicle is not being refueled and continues in step 312. In step 310, control sets $FLAG_{CL}$. In step 312, control stores the new or most recent $FUEL_{LEVEL}$ into memory and control ends.

Although the diesel exhaust control is described in detail above using the fueling station scenario as an example, it is appreciated that the diesel exhaust control can monitor other scenarios including, but not limited to, maintenance and/or oil change to determine whether the vehicle is located in a convenient location. For example, the diesel exhaust control can monitor vehicle maintenance flags stored in memory and determine that the vehicle is at a convenient location if one or more maintenance related flags are set or reset. Alternatively, the diesel exhaust control can monitor an oil level or an oil characteristic. For example, if the oil level ($OIL_{LEVEL}$) increases or an oil parameter ($OIL_{PAR}$) (e.g., including, but not limited to, electrical impedance) indicates that an oil change has just occurred, the diesel exhaust control can determine that the vehicle is at a convenient location to refill the dosing agent.

It is further anticipated that another input can be implemented to determine whether the vehicle is at a convenient location. For example, a global positioning system (GPS) may be implemented, such as that provided with a vehicle equipped with an OnStar™ system. The GPS can generate a signal indicating that the vehicle is at a convenient location.

Figure 4:
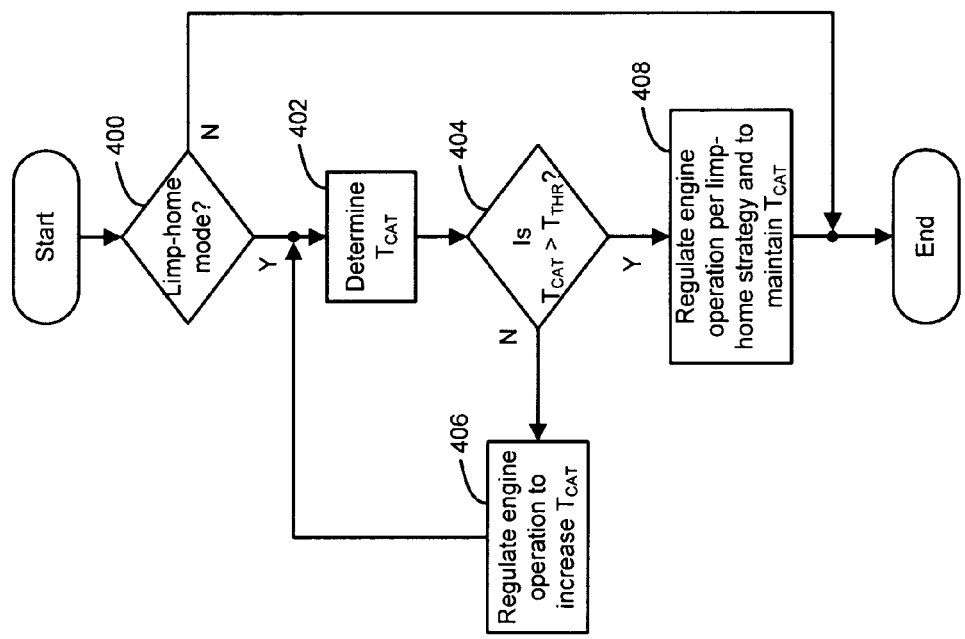
FIG. 4 is a flowchart illustrating exemplary steps executed by the diesel exhaust control during the limp-home mode.

Referring now to FIG. 4, exemplary steps that are executed by the diesel exhaust control during the limp-home mode will be described in detail. In step 400, control determines whether the vehicle is being operated in the limp-home mode. If the vehicle is not being operated in the limp-home mode, control ends. If the vehicle is being operated in the limp-home mode, control determines $T_{CAT}$ in step 402.

In step 404, control determines whether $T_{CAT}$ is greater than $T_{THR}$. If $T_{CAT}$ is not greater than $T_{THR}$, control regulates engine operation to increase $T_{CAT}$ in step 406 and loops back to step 402. If $T_{CAT}$ is greater than $T_{THR}$, control regulates engine operation per a limp-home strategy and to maintain $T_{CAT}$ and control ends.

Figure 5:
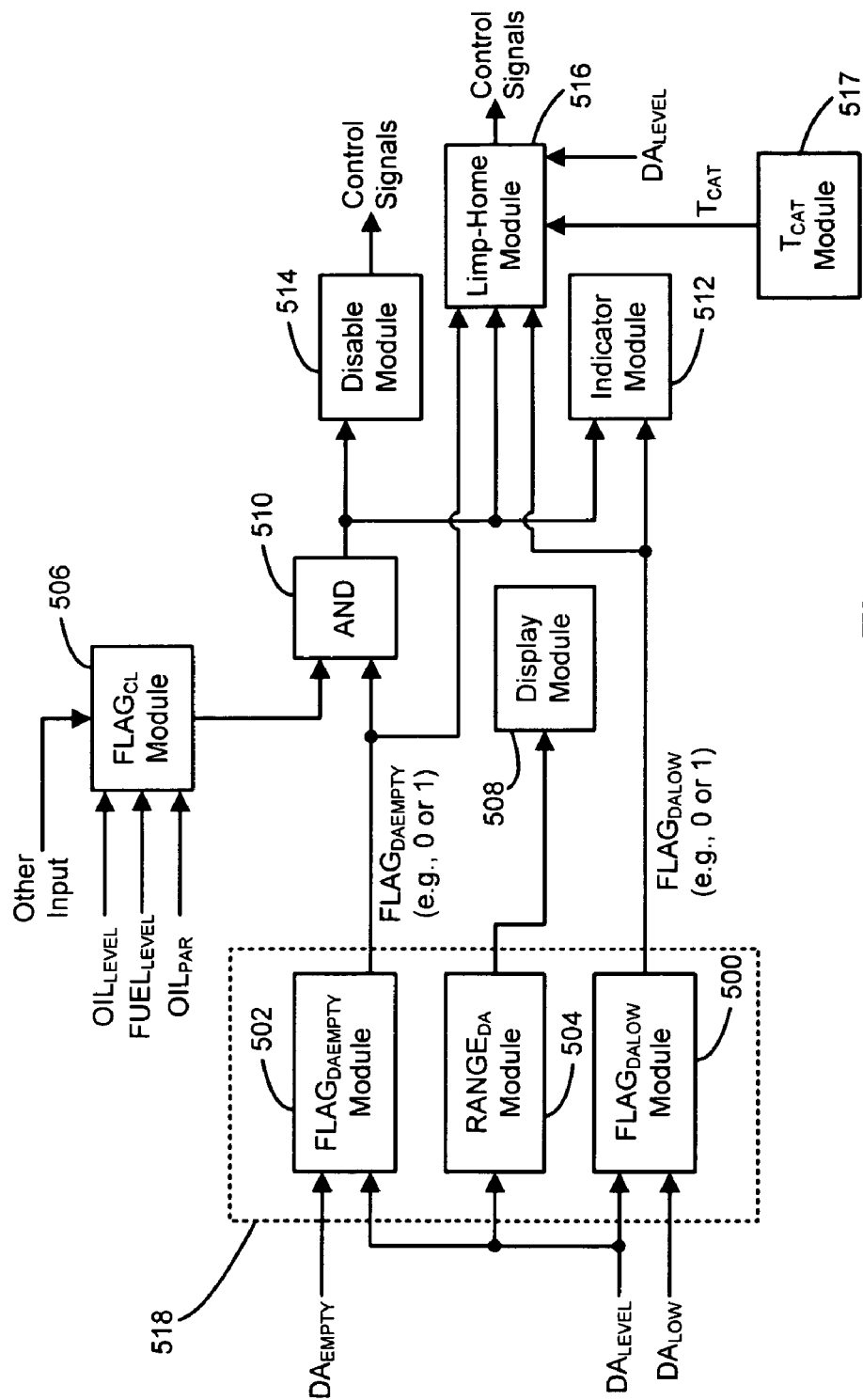
FIG. 5 is a functional block diagram illustrating exemplary modules that execute the extended emissions conformance control.

Referring now to FIG. 5, exemplary modules that execute the extended emissions conformance control of the present invention will be described in detail. The exemplary modules include a $FLAG_{DALOW}$ module 500, a $FLAG_{EMPTY}$ module 502, a $RANGE_{DA}$ module 504, a $FLAG_{CL}$ module 506, a display module 508, an AND module 510, an indicator module 512, a disable module 514, a limp-home module 516 and a $T_{CAT}$ module 517. The $FLAG_{DALOW}$ module 500, the $FLAG_{EMPTY}$ module 502 and the $RANGE_{DA}$ module 504 can be individual modules or can be sub-modules within a larger module 518.

The $FLAG_{DALOW}$ module 500 selectively sets $FLAG_{DALOW}$ based on $DA_{LEVEL}$ and $DA_{LOW}$. Similarly, the $FLAG_{DAEMPTY}$ module 502 selectively sets $FLAG_{DAEMPTY}$ based on $DA_{LEVEL}$ and $DA_{EMPTY}$. The $RANGE_{DA}$ module 504 calculates $RANGE_{DA}$ based on $DA_{LEVEL}$. The $FLAG_{CL}$ module 506 selectively sets $FLAG_{CL}$ based on $FUEL_{LEVEL}$, $OIL_{LEVEL}$ and/or $OIL_{PAR}$. It is also anticipated that $FLAG_{CL}$ can be selectively set based on maintenance flags or any other factor that would indicate the vehicle is at a convenient location. Furthermore, $FLAG_{CL}$ can be set based on another input, such as a signal generated by a GPS, as described above. The display module 508 graphically displays $RANGE_{DA}$ to alert the vehicle operator to the remaining distance the vehicle can travel before the dosing agent source is empty or below a desired level.

The AND module 510 generates a signal based on $FLAG_{DAEMPTY}$ and $FLAG_{CL}$. For example, if both $FLAG_{DAEMPTY}$ and $FLAG_{CL}$ are set (e.g., equal to 1) the AND module 510 outputs a signal indicating that the dosing agent is empty and the vehicle is located at a convenient location. The indicator module 512 generates an indication signal (e.g., audible and/or visual) based on $FLAG_{DAEMPTY}$ or $FLAG_{DALOW}$ to alert the vehicle operator to the status of the dosing agent source. The disable module 514 selectively disables vehicle operation based on the output of the AND module 510. More specifically, the disable module 514 generates control signals that disable vehicle operation until the dosing agent source is replenished.

The limp-home module 516 selectively regulates the vehicle operation based on $T_{CAT}$, $FLAG_{DAEMPTY}$, the output of the AND module 510, $FLAG_{DALOW}$ and/or $DA_{LEVEL}$. More specifically, the limp-home module 516 implements one of or a combination of the strategies described in detail above, and generates corresponding control signals. The $T_{CAT}$ module 517 determines $T_{CAT}$ and provides it to the limp-home module 516.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An exhaust after-treatment system for a vehicle including a dosing agent that is selectively injected into an exhaust from a dosing agent source, comprising:
   a first module that determines a level of said dosing agent within said dosing agent source,
   wherein said dosing agent includes ammonia;
   a second module that selectively generates a signal when said vehicle is at a predetermined location and an engine is started; and
   a third module that reduces vehicle performance when said level is less than a first predetermined level, said level is greater than a second predetermined level, and said signal is not generated, that regulates operation of said engine to increase a selective catalytic reduction (SCR) catalyst temperature when said SCR catalyst temperature is less than a predetermined temperature while said vehicle performance is reduced, and that disables said engine when said level is less than said second level and said signal is generated.

2. The exhaust after-treatment system of claim 1 wherein said third module operates said engine in a pre-mixed charge combustion ignition (PCCI) mode when said level is less than said first predetermined level, said level is greater than said second predetermined level, and said signal is not generated.

3. The exhaust after-treatment system of claim 1 wherein said third module transitions operation of said engine from a first mode to a second mode when said level is less than said first predetermined level, said level is greater than said second predetermined level, and said signal is not generated, and
   wherein output nitrogen oxides (NOx) and particulate matter amounts are less during operation in said second mode than during operation in said first mode.

4. The exhaust after-treatment system of claim 1 wherein said second module generates said signal when a difference between first and second fuel levels is greater than a predetermined amount,
   wherein said first fuel level is before said engine is started, and
   wherein said second fuel level is one of when and after said engine is started.

5. The exhaust after-treatment system of claim 1 wherein said second module generates said signal when a difference between first and second oil levels is greater than a predetermined amount,
   wherein said first oil level is before said engine is started, and
   wherein said second oil level is one of when and after said engine is started.

6. The exhaust after-treatment system of claim 1 wherein said second module selectively generates said signal based on a change in an oil parameter.

7. The exhaust after-treatment system of claim 6 wherein said oil parameter is electrical impedance of said oil.

8. The exhaust after-treatment system of claim 1 wherein said second module generates said signal based on a second signal from a global positioning system (GPS).

9. A method of extending emissions performance of an exhaust after-treatment system of a vehicle that includes a dosing agent, comprising:
   determining a level of said dosing agent within a dosing agent source,
   wherein said dosing agent includes ammonia;
   selectively generating a signal when said vehicle is at a predetermined location and an engine is started;
   reducing vehicle performance when said level is less than a first predetermined level, said level is greater than a second predetermined level, and said signal is not generated;
   regulating operation of an engine to increase a selective catalytic reduction (SCR) catalyst temperature when said SCR catalyst temperature is less than a predetermined temperature while said vehicle performance is reduced; and
   disabling said engine when said level is less than said second level and said signal is generated.

10. The method of claim 9 wherein said regulating includes operating said engine in a pre-mixed charge combustion ignition (PCCI) mode when said level is less than said first predetermined level, said level is greater than said second predetermined level, and said signal is not generated.

11. The method of claim 9 wherein said regulating includes transitioning operation of said engine from a first mode to a second mode when said level is less than said first predetermined level, said level is greater than said second predetermined level, and said signal is not generated, and
   wherein output nitrogen oxides (NOx) and particulate matter amounts are less during operation in said second mode than during operation in said first mode.

12. The method of claim 9 wherein said generating includes generating said signal when a difference between first and second fuel levels is greater than a predetermined amount,
   wherein said first fuel level is before said engine is started, and
   wherein said second fuel level is one of when and after said engine is started.

13. The method of claim 9 wherein said generating includes generating said signal when a difference between first and second oil levels is greater than a predetermined amount,
   wherein said first oil level is from before said engine is started, and
   wherein said second oil level is from one of when and after said engine is started.

14. The method of claim 9 wherein said generating includes generating said signal based on a change in an oil parameter.

15. The method of claim 14 wherein said oil parameter is an electrical impedance of said oil.

16. The method of claim 9 wherein said generating includes generating said signal based on a second signal from a global positioning system (GPS).

* * * * *